US011884343B2

(12) United States Patent
Hwang et al.

(10) Patent No.: US 11,884,343 B2
(45) Date of Patent: Jan. 30, 2024

(54) STEERING FEEL ASSISTING APPARATUS OF STEER-BY-WIRE SYSTEM

(71) Applicants: Hyundai Motor Company, Seoul (KR); Kia Motors Corporation, Seoul (KR)

(72) Inventors: Sang Woo Hwang, Seoul (KR); Young Dae Park, Asan-Si (KR); Byung Rim Lee, Seongnam-Si (KR); Min Jun Kim, Busan (KR); Se Hyun Chang, Suwon-Si (KR); Hyeon Seok Cho, Pyeongtaek-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 580 days.

(21) Appl. No.: 17/028,529

(22) Filed: Sep. 22, 2020

(65) Prior Publication Data

US 2021/0371008 A1    Dec. 2, 2021

(30) Foreign Application Priority Data

May 26, 2020    (KR) ........................ 10-2020-0063214

(51) Int. Cl.
| | | |
|---|---|---|
| *B62D 5/00* | (2006.01) | |
| *B62D 5/04* | (2006.01) | |
| *F16D 65/09* | (2006.01) | |
| *F16D 65/22* | (2006.01) | |
| *F16D 65/16* | (2006.01) | |
| *B62D 6/00* | (2006.01) | |
| *B62D 15/02* | (2006.01) | |

(52) U.S. Cl.
CPC ............. *B62D 6/008* (2013.01); *B62D 5/006* (2013.01); *B62D 5/0421* (2013.01); *B62D 15/0215* (2013.01)

(58) Field of Classification Search
None
See application file for complete search history.

(56) References Cited

U.S. PATENT DOCUMENTS

| | | | |
|---|---|---|---|
| 2011/0155486 A1* | 6/2011 | Iwaki | B60T 13/746 |
| | | | 188/106 P |
| 2020/0130733 A1* | 4/2020 | Hwang | B62D 5/0484 |
| 2022/0003285 A1* | 1/2022 | Pitt | F16D 65/08 |
| 2022/0153337 A1* | 5/2022 | Lee | B62D 5/005 |

FOREIGN PATENT DOCUMENTS

| | | | | |
|---|---|---|---|---|
| JP | 2017096436 A | * | 6/2017 | ............... B61H 5/00 |
| KR | 10 0421423 | | 3/2004 | |

\* cited by examiner

*Primary Examiner* — Adam D Tissot
*Assistant Examiner* — Laura E Linhardt
(74) *Attorney, Agent, or Firm* — MORGAN, LEWIS & BOCKIUS LLP

(57) ABSTRACT

A steering feel assisting apparatus of a steer-by-wire (SBW) system, may include a disk configured to rotate together with a steering shaft; a cam engaged to an actuator and configured to receive a rotational force of the actuator to be eccentrically rotated; and a brake arm configured to selectively friction-contact with an external peripheral surface of the disk to provide a predetermined frictional force in a forward rotation direction of the disk as the brake arm rotates in conjunction with rotation of the cam.

18 Claims, 7 Drawing Sheets

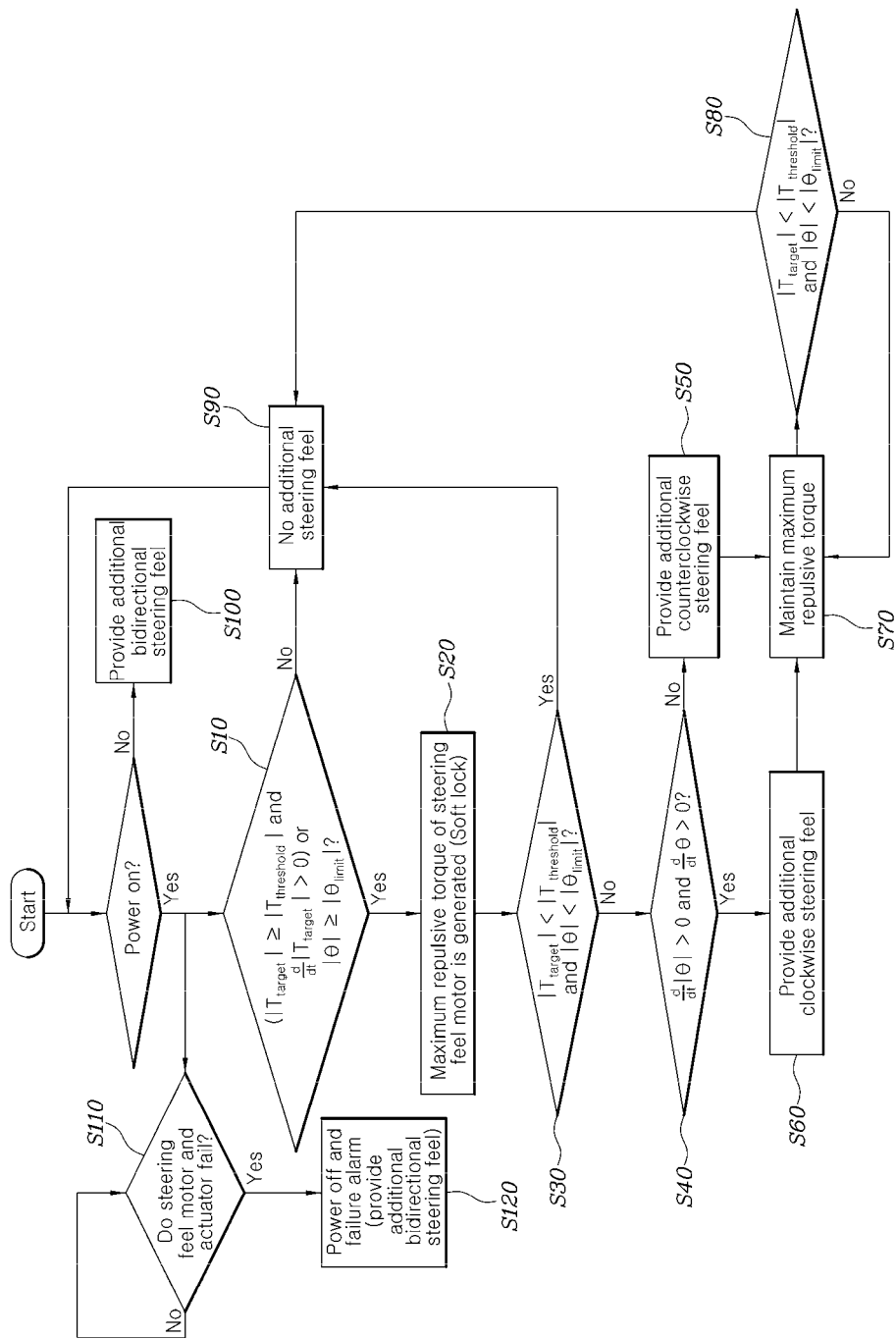

STEERING FEEL ASSISTING APPARATUS OF STEER-BY-WIRE SYSTEM

CROSS REFERENCE TO RELATED APPLICATION

The present application claims priority to Korean Patent Application No. 10-2020-0063214, filed on May 26, 2020, the entire contents of which is incorporated herein for all purposes by this reference.

BACKGROUND OF THE INVENTION

Field of the Invention

The present invention relates to a steering feel assisting apparatus of a steer-by-wire (SBW) system which can selectively assist a steering feel of a steering wheel.

Description of Related Art

A steer-by-wire (SBW) system is a steering system in which mechanical connection of a steering wheel and driving wheels of a vehicle are separated, and a rotation signal of the steering wheel is input through an electronic control unit (ECU), and a steering motor connected to the driving wheels are operated based on the input rotation signal to steer the vehicle.

The steer-by-wire system can increase the degree of freedom of a layout according to the configuration of the steering system, can improve fuel ratio, and can remove turbulences reversely input from the vehicle wheels by removing a mechanical connection structure of an existing steering system.

Meanwhile, steering information required by the driver cannot be properly fed back due to an interruption of a mechanical connection structure, and accordingly, an additional safety element is necessary in preparation of an existing MDPS.

For example, the items representatively required by a steering feel apparatus may include a fail operation function of allowing an operation of the steering feel apparatus even when a steering angle sensor fails, a function of preventing abrupt loss of a steering feel, and a function of preventing free rotation of the steering wheel even when the power of the system is switched off.

In a more detailed description, because the wrong behavior of a vehicle may occur as the system fails to recognize a steering input of the driver when the steering angle sensor fails, a fail operation system is necessary, and accordingly, a triple modular redundancy or 2002 DFS scheme which is one of the fail operation systems is used.

In the steering feel, because the vehicle may be unstable (an oversteer or the like) as an intended large steering input is made if a steering feel is abruptly lost when the driver makes a steering input, this problem may be prevented.

To achieve this, a measure of providing a fail operation system by adding redundancy to a steering feel motor has been suggested (a dual winding motor and the like).

Furthermore, during a power-off of the vehicle (start-off), no force is applied to the steering wheel. Accordingly, the system is switched on (started on) when the steering wheel rotates freely in the power-off state of the vehicle and is greatly different from the location of a load wheel, and an abrupt movement of the load wheel may occur for the arrangement thereof.

Accordingly, a method of adding a stopper device configured for preventing rotation of a steering wheel or inserting an additional logic for arranging the present during switching-on of the system has been mentioned.

However, a method of employing a fail operation system of a steering feel motor configured for preventing loss of a steering feel may be a certain measure, but the costs of the component greatly increase.

Furthermore, attachment of an additional device to prevent rotation of a steering wheel during power-off of the system also is a cause of increase in manufacturing costs, and because rotation of the steering wheel may be locked when the device fails, a fail safe function against that problem is additionally necessary.

The information included in this Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a steering feel assisting apparatus of an SBW system which can selectively assist a steering feel of a steering wheel.

In accordance with an aspect of the present invention, a steering feel assisting apparatus of a steer-by-wire (SBW) system includes: a disk configured to rotate together with a steering shaft; a cam engaged to an actuator and configured to receive a rotational force of the actuator to be eccentrically rotated; and a brake arm configured to selectively friction-contact with an external peripheral surface of the disk to provide a predetermined frictional force in a forward rotation direction of the disk as the brake arm rotates in conjunction with rotation of the cam.

A rotation shaft may be provided at one end portion of the brake arm and the cam may contact with a middle portion of the brake arm whereby a second end portion of the brake arm rotates about the rotation shaft in a direction in which the second end portion of the brake arm becomes closer to or far away from the disk as the cam eccentrically rotates and selectively friction-contacts with the external peripheral surface of the disk.

The steering feel assisting apparatus may further include a press spring mounted on a housing and configured to provide an elastic force to the brake arm in a rotation direction in which the second end portion of the brake arm faces the disk.

The brake arm may include a first brake arm and a second brake arm provided on a first side and a second side of the cam, respectively, rotation shafts of one end portion of the first brake arm and one end portion of the second brake arm may be located in directions that are opposite to the disk with respect to the cam; and an opposite end portion of the first brake arm and an opposite end portion of the second brake arm may be located on one side and an opposite side of the disk, respectively.

The opposite end portion of the brake arm may friction-contact any one point of a rotation radius of the cam, which contacts with the external peripheral surface of the disk while drawing a tangential line.

A disk may be shaft-coupled to the steering shaft, a cam may be mounted on a side of the disk, and the axial direction of the axes of rotation of the disk, the cam, and the brake arm may be in the same direction to be parallel to each other.

The brake arm may selectively friction-contact with the disk for eccentric directions of the cam; both the second end portion of the first brake arm and the second end portion of the second brake arm may be released from the friction-contact with the disk in a first eccentric direction in which the cam is eccentric toward the first and second rotation shafts in an entire rotation section of the cam; only the opposite end portion of the first brake arm may friction-contact with the disk in a second eccentric direction in which the cam is eccentric toward the second brake arm; only the opposite end portion of the second brake arm may friction-contact with the disk in a third eccentric direction in which the cam is eccentric toward the first brake arm; and both the second end portion of the first brake arm and the second end portion of the second brake arm may friction-contact with the disk in a fourth eccentric direction in which the cam is eccentric toward the disk.

The steering feel assisting apparatus may further include a return spring mounted on a housing, engaged to the cam, and configured to provide an elastic force in an eccentric direction in which the cam rotates toward the disk.

A friction brush may be separately coupled to the second end portion of the brake arm to friction-contact with the external peripheral surface of the disk, and a friction pattern may be formed on the friction surface of the disk.

The steering feel assisting apparatus may further include: a steering angle sensor configured to detect a steering angle of the steering shaft; a steering feel motor configured to provide a steering feel to the steering shaft; a steering motor coupled to a rack bar and configured to provide a steering force to the rack bar; and a controller electrically connected to the steering angle sensor, the steering feel motor, the steering motor and the actuator and configured to selectively provide the steering feel in a forward rotation direction of the steering shaft by controlling an operation of a steering feel motor or an actuator based on the steering angle and a torque value of the steering motor.

The controller may restrict rotation of the steering shaft by generating a maximum repulsive force in the steering feel motor when an absolute value of a target torque of the steering motor is equal to or greater than an absolute value of a threshold torque and a differential value of the absolute value of the target torque is more than 0 or an absolute value of the steering angle reaches an absolute value of a restraint angle corresponding to an end of the steering angle.

The controller: after a maximum torque is generated by the steering feel motor, may maintain the absolute value of the target torque at the absolute value of the threshold torque or more, and when the absolute value of the steering angle is maintained at the restraint angle or more, may determine a rotation direction of the disk, in which the predetermined frictional force is to be provided; and may provide a frictional force to forward or reverse rotation of the disk through a brake arm by controlling rotation of the cam by the actuator.

When a target frictional direction of the disk is a reverse direction thereof, the first brake arm may friction-contact with the disk by controlling rotation of the cam, and the second brake arm may be released from the friction-contact with the disk to friction-contact with the disk for the reverse rotation of the disk; and when a target constraint direction of the disk is a forward direction, the second brake arm may be brought into friction-contact with the disk by controlling rotation of the cam, and the first brake arm may be released from the friction-contact with the disk to friction-contact with the disk for the forward rotation of the disk.

The controller may perform a control to maintain a maximum repulsive force of the steering feel motor in a process of providing a frictional force to the disk by the brake arm.

The controller may be configured to control both the first brake arm and the second brake arm to be released form the friction-contact with the disk when the absolute value of the target torque is less than the absolute value of the threshold torque and the absolute value of the steering angle is less than the restraint angle after the maximum repulsive force is generated by the steering feel motor.

The controller may perform a control to provide a frictional force in the forward rotation direction of the disk by bringing the first brake arm and the second brake arm into friction-contact with the disk by controlling rotation of the cam during a start-off of a vehicle.

Through the solutions, according to various exemplary embodiments of the present invention, an additional steering feel is provided only for a steering rotation direction which is to be restricted by selectively bringing a disk into friction-contact according to a change in the rotational angle of a cam through control of an actuator.

Accordingly, a torque which is lack may be additionally provided to a steering feel motor when the driver desires to feel a high load, and a reverse lock phenomenon of a steering wheel may be removed by allowing rotation of the steering wheel when the driver abruptly performs a reverse operation of the steering wheel in a state in which one-directional rotation of the disk is restricted.

Furthermore, because the steering sensitivity may be lowered by immediately providing a frictional force to the driver and preventing abrupt steering when a steering feel motor fails while driving of the vehicle, the manipulation and driving safety may be provided to the driver, and a function of preventing excessive bidirectional rotation of the steering wheel may be realized without an additional configuration or application of an electric voltage in a start-off state.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart illustrating a control process of restricting a steering angle according to various exemplary embodiments of the present invention.

Figure 1:
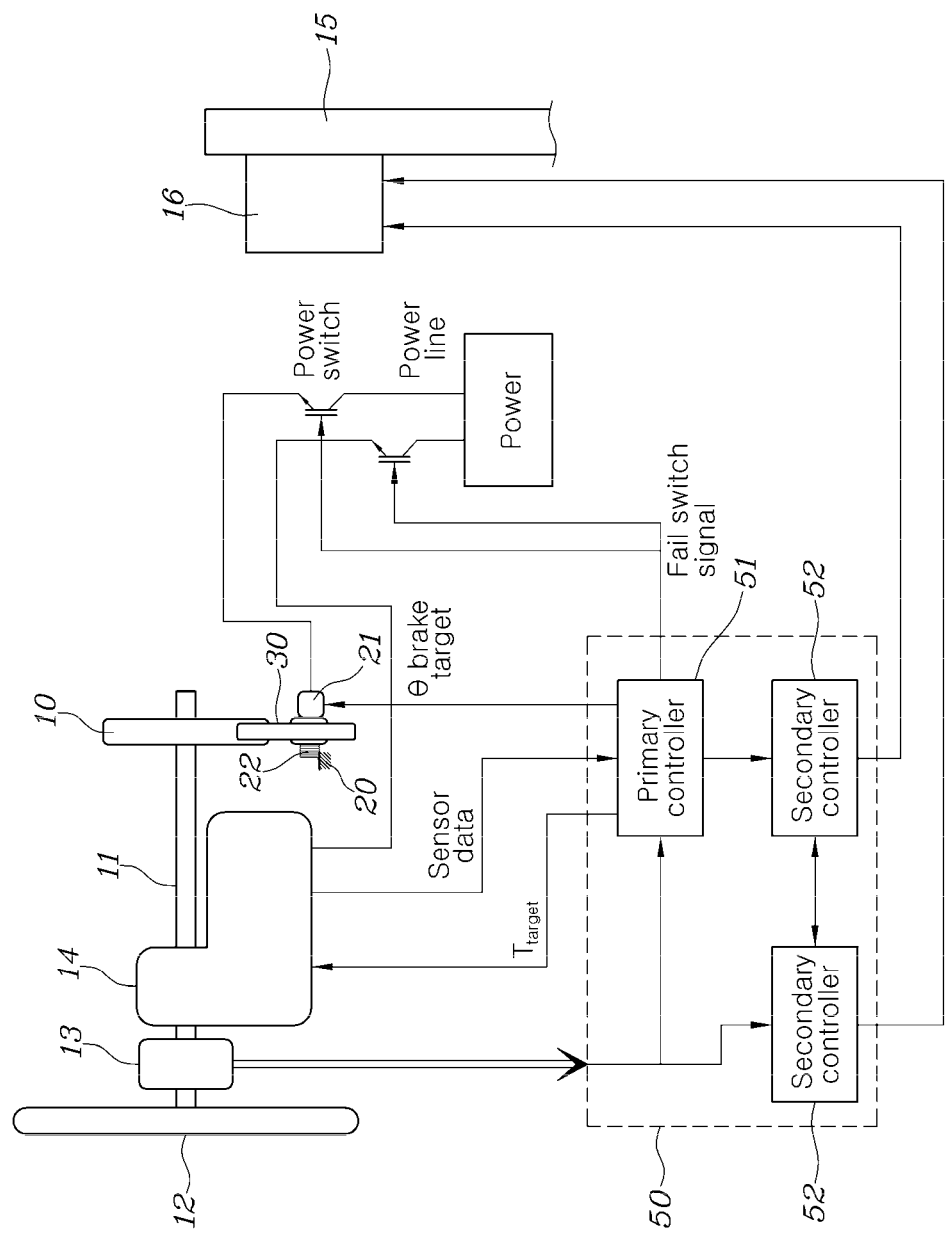
FIG. 1 is a view exemplarily illustrating a configuration of an SBW system, in which a steering feel assisting apparatus is mounted, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail with reference to the accompanying drawings.

A steering feel assisting apparatus of an SBW system according to various exemplary embodiments of the present invention includes a disk 10, a cam 20, and a brake arm 30.

Referring to FIG. 1, in a detailed description of the present invention, first, the disk 10 rotates together with a steering shaft 11, and for example, the disk 10 is fitted with and coupled to the steering shaft 11 and rotates in a state in which the disk 10 is constrained together with the steering shaft 11. The steering shaft 11 may be a column shaft that rotates together with the steering wheel 12.

The cam 20 receives a rotational force of an actuator 21 to eccentrically rotate, and may be provided on a side of the disk 10.

Furthermore, the brake arm 30 selectively friction-contacts with the external peripheral surface of the disk 10 as it rotates in conjunction with rotation of the cam 20 to provide a predetermined frictional force in a forward rotation direction of the disk 10. Here, the predetermined frictional force may be a torque of about 5 Nm.

The brake arm 30 extends along a longitudinal direction thereof, and the rotation shaft 31 is provided at one end portion thereof and the cam 20 contacts with a middle portion thereof whereby the opposite end portion of the brake arm 30 rotates about the rotation shaft 31 in a direction in which the opposite end portion of the brake arm 30 becomes closer to or far away from the disk 10 as the cam 20 rotates, and accordingly, the opposite end portion of the brake arm 30 contacts with the external peripheral surface of the disk 10 or is released from the contact with the external peripheral external peripheral surface of the disk 10.

In a more detailed description of the configuration of the brake arm 30, the brake arm 30 includes a first brake arm 30a provided on one side of the cam 20 and a second brake arm 30b provided on an opposite side of the cam 20.

The rotation shaft 31 of the first brake arm 30a and the rotation shaft 31 of the second brake arm 30b are located in a direction which is opposite to the disk 10 with respect to the cam 20, and an opposite end portion of the first brake arm 30a and an opposite end portion of the second brake arm 30b are located on one side and an opposite side of the disk 10.

Accordingly, the rotation shaft 31 of the first brake arm 30a and the rotation shaft 31 of the second brake arm 30b may be individually mounted, and the axial directions of the rotation shafts 31 may be the same as the axial directions of the disk 10 and the cam 20 to be parallel to each other.

Moreover, the rotation of the disk 10 has to be restricted when the disk 10 rotates from the opposite end portion of the brake arm 30 toward the one end portion of the brake arm 30, and the rotation of the disk 10 has to be allowed when the disk 10 rotates from the one end portion of the brake arm 30 toward the opposite end portion of the brake arm 30.

Accordingly, the location of the disk 10, which the opposite end portion of the brake arm 30 friction-contacts, is required to be regulated to a specific location, and in various exemplary embodiments of the present invention, the opposite end portion of the brake arm 30 may friction-contact one point of the external peripheral external peripheral surface of the disk 10, which faces the cam 20.

In more detail, in various exemplary embodiments of the present invention, the opposite end portion of the brake arm 30 has to friction-contact any one point of a rotation radius of the cam 20, which contacts with the external peripheral external peripheral surface of the disk 10 while drawing a tangential line. Accordingly, a steering feel may be provided while the opposite end portion of the brake arm 30 friction-contacts with an external peripheral surface of the disk 10 more strongly.

Figure 3:
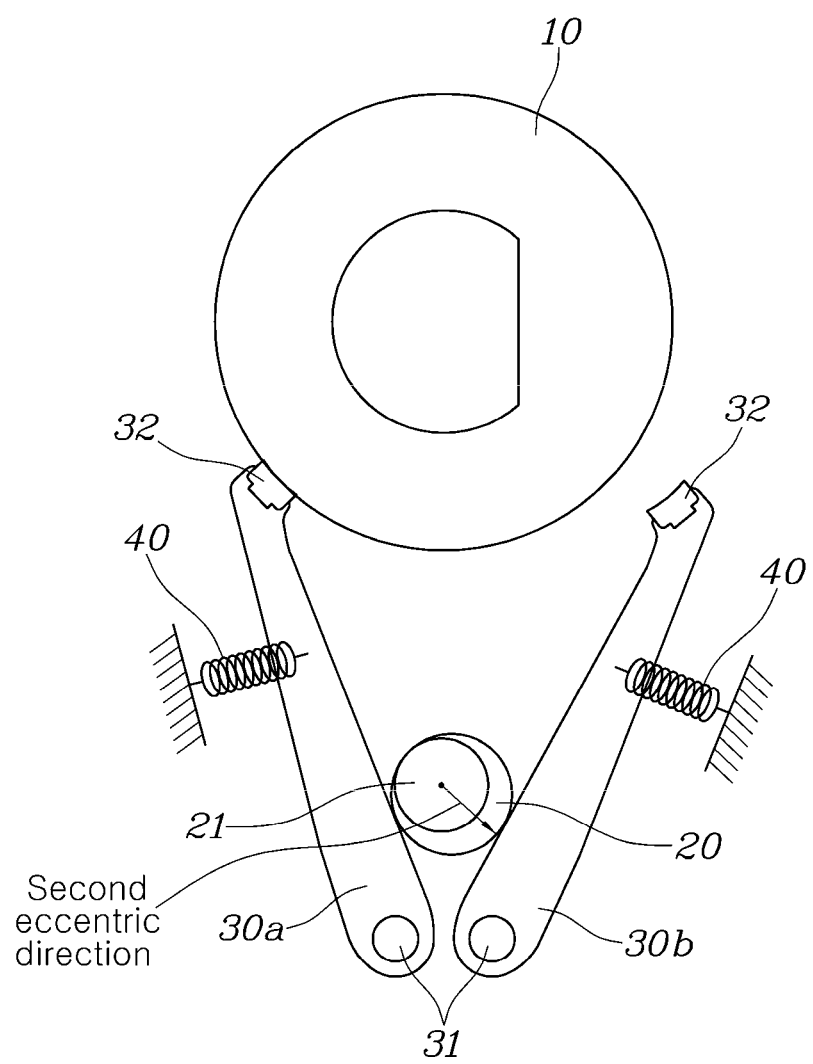
FIG. 3 is a view exemplarily illustrating an operational state of providing a frictional force for reverse rotation of a steering shaft according to various exemplary embodiments of the present invention.

That is, because the opposite end portion of the left first brake arm 30a friction-contacts with the external peripheral surface of the disk 10 in a state in which the cam 20 eccentrically rotates to the right side as in FIG. 3, a frictional force is applied to the reverse (counterclockwise direction) of the disk 10 to make the reverse pivotal movement of the steering wheel 12 difficult. However, in the instant case, because a friction is not high for the forward rotation of the disk 10, the steering wheel 12 may easily rotate in a forward direction in the case of abrupt forward steering of the driver.

Figure 4:
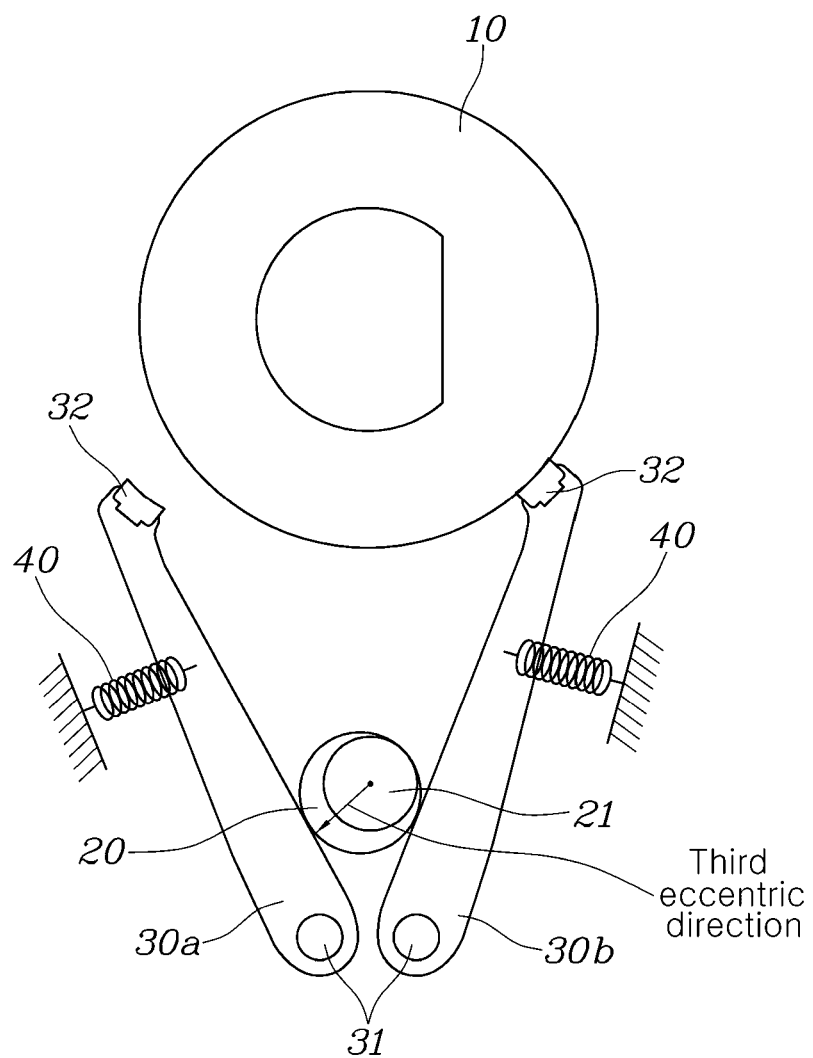
FIG. 4 is a view exemplarily illustrating an operational state of providing a frictional force for forward rotation of a steering shaft according to various exemplary embodiments of the present invention.

Likewise, as in FIG. 4, because the opposite end portion of the right second brake arm 30b friction-contacts with the external peripheral surface of the disk 10 in a state in which the cam 20 eccentrically rotates to the left side as in FIG. 4, a frictional force is applied to the forward (clockwise direction) of the disk 10 to make the forward pivotal movement of the steering wheel 12 difficult. However, in the instant case, because a friction is not high for the reverse rotation of the disk 10, the steering wheel 12 may easily rotate in a reverse direction in the case of abrupt reverse steering of the driver.

Accordingly, the present invention may selectively provide a frictional force in the forward rotation direction of the steering shaft 11 by use of a plurality of brake arms 30 provided outside the disk 10, and in a state in which a frictional force is applied in a specific rotation direction of the steering shaft 11, the steering shaft 11 may rotate easily in an opposite direction thereof, and a locking phenomenon of the steering wheel 12 does not occur because the steering wheel 12 may rotate even though the driver abruptly performs a reverse steering operation.

Moreover, the present invention may further include a press spring 40 that is mounted on a housing 45 and provides an elastic force in a rotation direction in which the opposite end portion of the brake arm 30 faces the disk 10.

For example, because the press spring 40 is connected between the first brake arm 30a and the vehicle body, and between the second brake arm 30b and the vehicle body, respectively, the opposite end portion of the brake arm 30 is pushed toward the disk 10 by a tensile force of the press spring 40 if the cam 20 eccentrically rotates, and accordingly, the opposite end portion of the brake arm 30 which is spaced from the disk 10 friction-contacts with the disk 10 to restrict one-directional rotation of the disk 10.

In the present way, in various exemplary embodiments of the present invention, the brake arm 30 is configured to selectively friction-contact with the disk 10 for eccentric directions of the cams 20.

Figure 2:
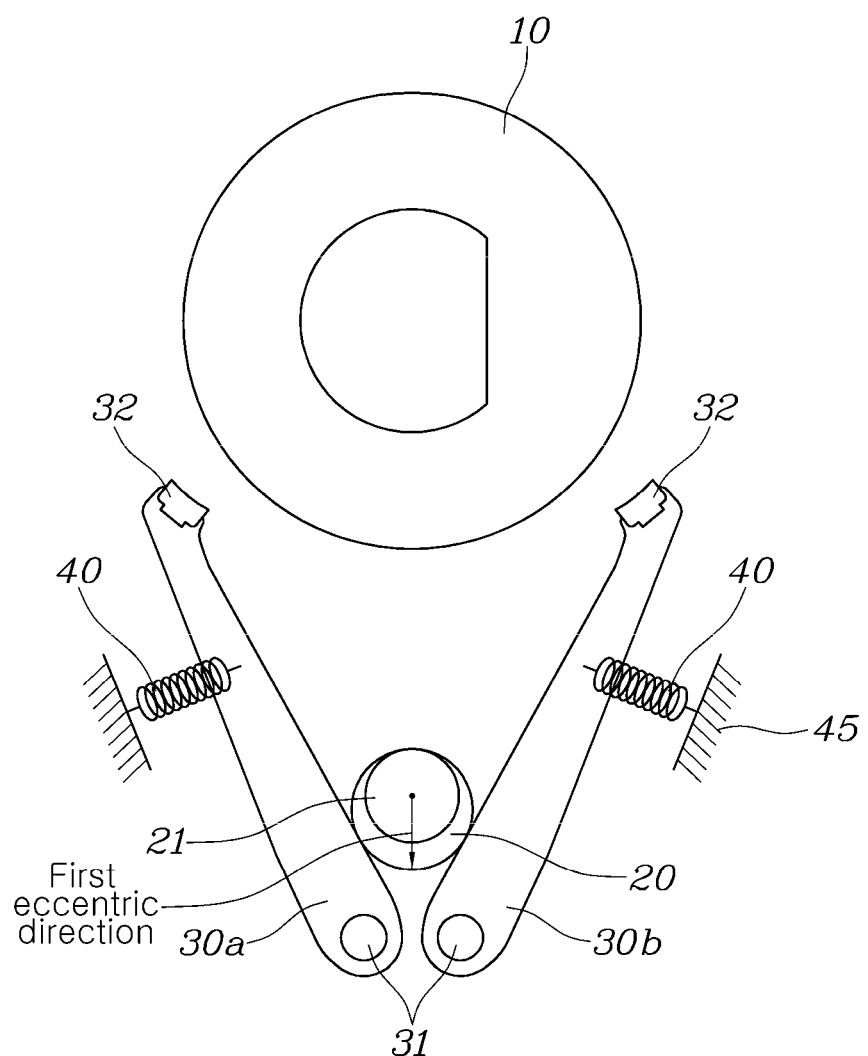
FIG. 2 is a view exemplifying a configuration of a steering angle restraining apparatus according to various exemplary embodiments of the present invention.

For example, as in FIG. 2, because both the opposite end portion of the first brake arm 30a and the opposite end portion of the second brake arm 30b are released from the friction-contact with the disk 10 in the first eccentric direction in which the cam 20 in the entire rotation section of the cam 20 is eccentric toward the rotation shaft 31, and the disk 10 rotate freely clockwise or counterclockwise whereby the steering wheel 12 may pivot leftwards and rightwards.

Furthermore, as in FIG. 3, in the second eccentric direction which is connected to the first eccentric direction and in which the cam 20 is eccentric toward the second brake arm 30b, only the opposite end portion of the first brake arm 30a friction-contacts with the disk 10, and thus counterclockwise rotation of the disk 10 is restricted and clockwise rotation of the disk 10 is allowed to restrict the leftward pivot of the steering wheel 12.

Figure 5:
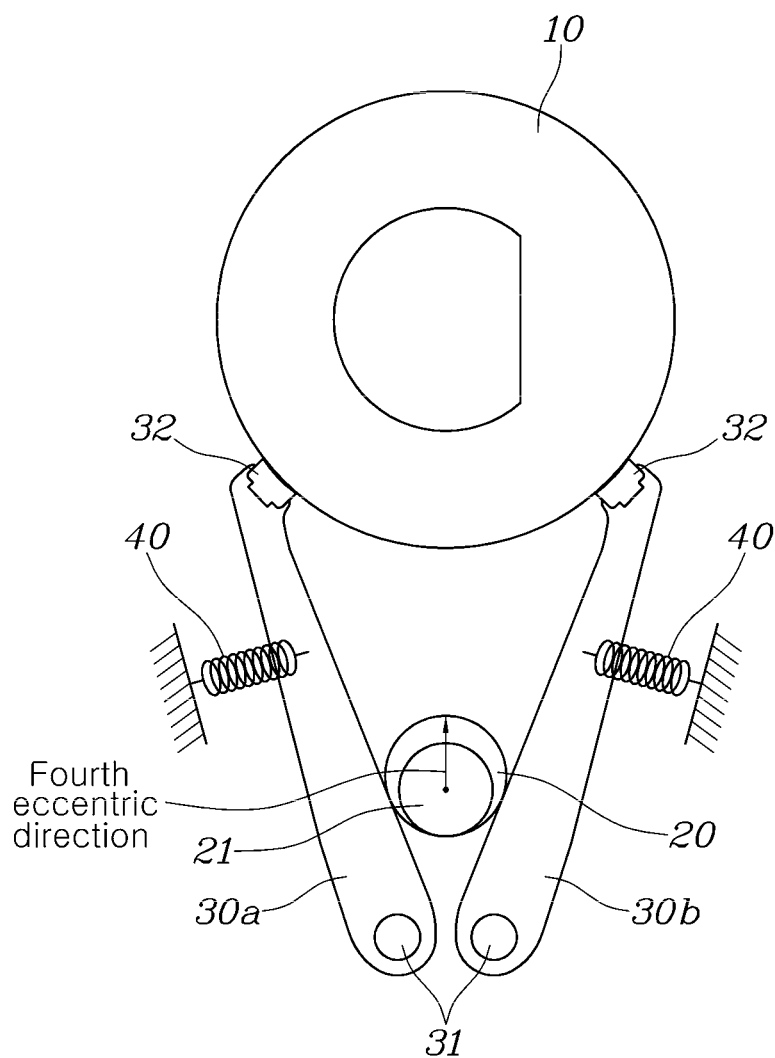
FIG. 5 is a view exemplarily illustrating an operational state of providing a frictional force for bidirectional rotation of a steering shaft according to various exemplary embodiments of the present invention.

Furthermore, as in FIG. 5, in a fourth eccentric direction which is connected to the second eccentric direction and in which the cam 20 is eccentric toward the disk 10, both the opposite end portion of the first brake arm 30a and the opposite end portion of the second brake arm 30b friction-contact with the disk 10, an thus both clockwise and counterclockwise rotations of the disk 10 are restricted to restrict both the leftward pivot and the rightward pivot of the steering wheel 12.

Furthermore, as in FIG. 4, in the third eccentric direction which is connected between the first eccentric direction and the fourth eccentric direction and in which the cam 20 is eccentric toward the first brake arm 30a, only the opposite end portion of the second brake arm 30b friction-contacts with the disk 10, and thus clockwise rotation of the disk 10 is restricted and counterclockwise rotation of the disk 10 is allowed to restrict the rightward pivot of the steering wheel 12.

Moreover, the present invention may further include a return spring 22 that is mounted on the housing 45 and provides an elastic force in a rotation direction in which the cam 20 is eccentric toward the disk 10.

For example, the return spring 22 may be a torsion spring, and in a state in which the return spring 22 is fitted with the shaft of the cam 20, one end portion of the return spring 22 is coupled to an end portion of the cam 20 and an opposite end portion of the return spring 22 is fixed to the vehicle body, and thus provides an elastic force such that the cam 20 is located in a direction in which the cam 20 is eccentric toward the disk 10, that is, the fourth eccentric direction.

That is, when an electric voltage is applied neither to the steering feel motor 14 and the actuator 21, the cam 20 is eccentric in the fourth eccentric direction in which the cam 20 faces the disk 10 by the elastic force of the return spring 22, and thus both the leftward pivot and the rightward pivot of the steering wheel 12 are restricted as both the opposite end portion of the first brake arm 30a and the opposite end portion of the second brake arm 30b friction-contact with the disk 10.

Of course, when the actuator 21 is normally operated, the operational force of the actuator 21 is higher than the elastic force of the return spring 22, and thus the eccentric direction of the cam 20 may be controlled according to an operation of the actuator 21.

Figure 6:
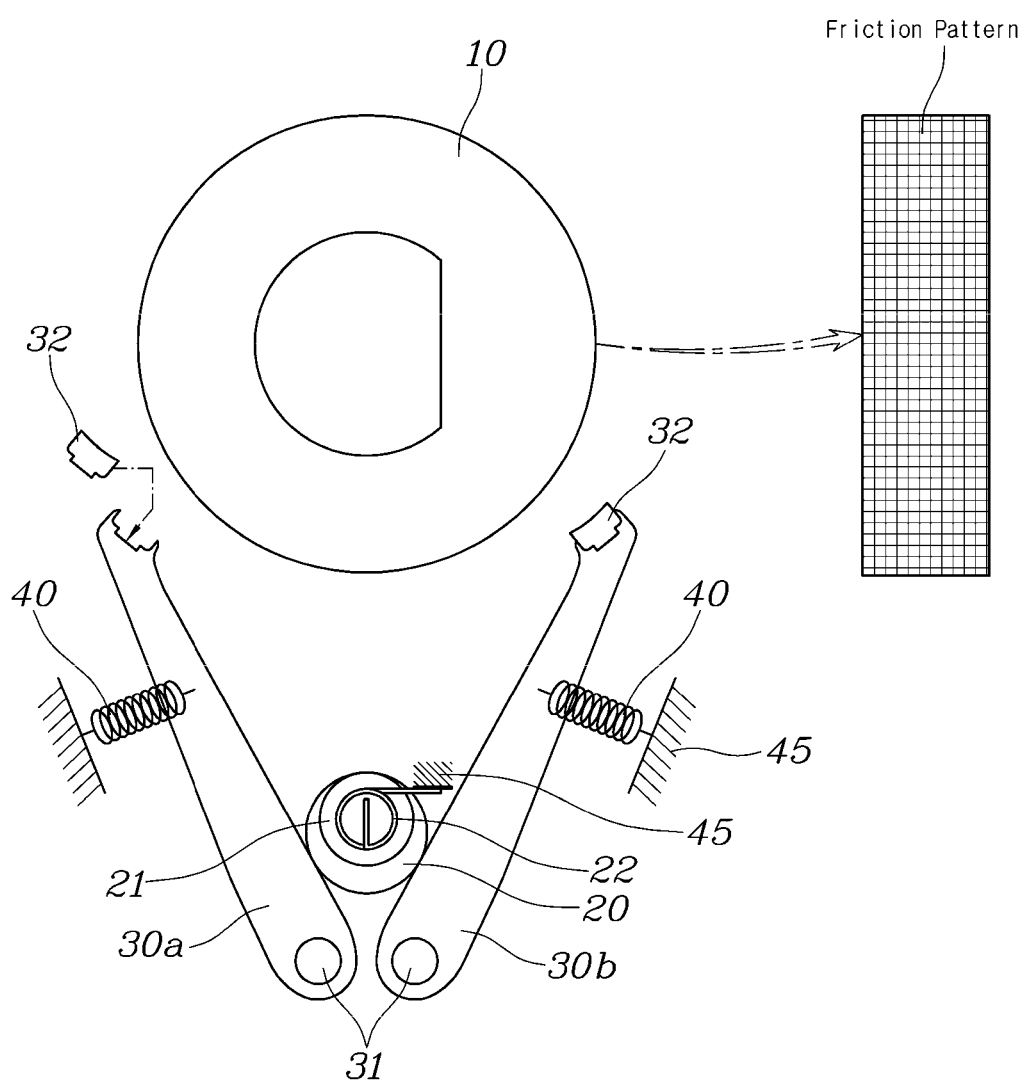
FIG. 6 is a view exemplifying a configuration of mounting and demounting a friction brush on and from a brake arm, and a friction pattern formed on a surface of a disk according to various exemplary embodiments of the present invention.

Meanwhile, as illustrated in FIG. 6, in various exemplary embodiments of the present invention, a friction brush 32 is separately coupled to the opposite end portion of the brake arm 30 to friction-contact with an external peripheral surface of the disk.

Furthermore, a friction pattern is formed on the frictional external peripheral surface of the disk 10. The friction pattern may have various shapes such as a grid shape, a wave shape, and a zig-zag shape.

That is, when the frictional surface of the friction brush 32 is worn and the frictional force is reduced, only the friction brush 32 may be replaced to be used, and a steering feel of a predetermined value or more may be maintained conveniently at low costs, and the frictional force between the disk 10 and the friction brush 32 may be increased by the friction pattern formed on the external peripheral surface of the disk 10.

Meanwhile, in various exemplary embodiments of the present invention, an additional steering feel is generated by controlling operations of the actuator 21 and the steering feel motor 14 by the controller 50 and providing a frictional force in a steering rotation direction of the steering wheel 12.

To achieve this, the present invention may further include a steering angle sensor 13, a steering motor 16, and a controller 50, in addition to the steering feel motor 14.

The controller 50 according to various exemplary embodiments of the present invention may be implemented by an algorithm configured to control operations of various elements of the vehicle, a nonvolatile memory configured to store data on a software instruction for reproducing the algorithm, and a processor configured to perform an operation, which will be described below, by use of the data stored in the memory. Here, the memory and the processor may be implemented by individual chips. Alternatively, the memory and the processor may be implemented by an integrated single chip. The processor may take the form of one or more processors.

In a detailed description with reference to FIGS. 1 and 12, the steering angle sensor 13 is mounted in the steering shaft 11 to detect the steering angle of the steering shaft 11, the steering feel motor 14 is mounted to provide a steering feel to the steering shaft 11, and the steering motor 16 is mounted to provide a steering force to the rack bar 15.

Furthermore, the torque values (current values) of the steering angle sensor 13 and the steering motor 16 are input through the controller 50, and a steering feel is selectively provided in the forward rotation direction of the steering shaft 11 by controlling an operation of the steering feel motor 14 or the actuator 21 based on the input steering angle and the torque value of the steering motor 16.

For example, the controller 50 is configured to restrict rotation of the steering shaft 11 by generating a maximum repulsive force (soft lock) in the steering feel motor 14 when an absolute value of a target torque $T_{target}$ of the steering motor 16 is an absolute value of a threshold torque $T_{threshold}$ or more and a differential value of an absolute value of the target torque $T_{target}$ is more than 0 or an absolute value of the steering angle θ reaches an absolute value of a restraint angle $θ_{limit}$ corresponding to an end of the steering angle. The soft lock may be a maximum torque which may be output through the steering feel motor 14 to restrain the rotation of the steering shaft 11.

That is, when it is determined that the steering wheel 12 is turned fully to any one side and reaches an end of the steering angle or only a target current of the steering motor 16 increases to more than an allowable current in a situation in which the tire steering angle cannot increase further as the tires contact with a curb stone, a maximum current which may be output through the steering feel motor 14 is generated to restrict rotation of the steering shaft 11 (soft lock).

Moreover, the controller 50 maintains the absolute value of the target torque $T_{target}$ at the absolute value of the threshold torque $T_{threshold}$ or more after the maximum torque is generated by the steering feel motor 14, and determines a rotation direction of the disk 10, to which a frictional force is to be provided, when the absolute value of the steering angle θ is maintained at the restraint angle $θ_{limit}$ or more.

Furthermore, a frictional force for forward or reverse rotation of the disk 10 may be provided through the brake arm 30 by controlling a rotational operation of the cam 20 by the actuator 21.

In detail, when a target constraint direction of the disk 10 is a reverse direction thereof, the first brake arm 30a is brought into friction-contact with the disk 10 by controlling the rotational operation of the cam 20, and a steering feel of a predetermined value or more is additionally provided for reverse rotation of the disk 10 by releasing the second brake arm 30b from the friction-contact with the disk 10.

Furthermore, when a target constraint direction of the disk 10 is a forward direction thereof, the second brake arm 30b is brought into friction-contact with the disk 10 by controlling the rotational operation of the cam 20, and a steering feel of a predetermined value or more is additionally provided for forward rotation of the disk 10 by releasing the first brake arm 30a from the friction-contact with the disk 10.

That is, when the state of an end of the steering angle is maintained or a target current of the steering motor 16 increases further after the soft lock that restricts rotation of the steering shaft 11 by the steering feel motor 14 first, an additional steering feel is provided in the leftward pivot or the rightward pivot direction of the steering wheel 12 by restricting forward or reverse rotation of the disk 10 through the rotational operation of the first brake arm 30a or the second brake arm 30b.

Meanwhile, the controller 50 may perform a control to maintain the maximum torque of the steering feel motor 14 in a process of providing a frictional force to the rotational operation of the disk 10 by the brake arm 30.

That is, the driver certainly recognizes that it is difficult to rotate the steering angle by maintaining the soft lock operation by the steering feel motor 14 in a state in which a steering feel is provided by applying a frictional force to the disk 10 through an operation of the brake arm 30.

Moreover, the controller 50 may control the rotational operation of the cam 20 during the start-off of the vehicle to restrict both forward and reverse rotations of the disk 10 as the first brake arm 30a and the second brake arm 30b friction-contact with the disk 10.

That is, in a state in which the vehicle starts off, a function of preventing easy rotation of the steering wheel 12 is required, and as in FIG. 5, the cam 20 is operated such that both the opposite end portion of the first brake arm 30a and the opposite end portion of the second brake arm 30b friction-contact with an external peripheral surface of the disk and the frictional force increases, and through this, easy rotation of the steering wheel 12 may be prevented.

Moreover, the controller 50 monitors a failure of the steering feel motor 14 and the actuator 21 during a start-up of the vehicle. When it is determined in the monitoring result that the steering feel motor 14 and the actuator 21 failed, an electric voltage applied to the steering feel motor 14 and the actuator 21 is interrupted, and the failure situation is notified to the driver through voice or a display to alert the driver.

Accordingly, because the eccentric direction of the cam 20 eccentrically rotates in a direction in which the eccentric direction faces the disk 10 by the elastic force of the return spring 22 if the voltage applied to the steering feel motor 14 and the actuator 21 is interrupted, the frictional force increases as the friction brushes 32 of the two brake arms 30 friction-contact with the external peripheral surface of the disk 10, and through this, rotation of the steering wheel 12 is restricted.

Meanwhile, in a description of a process of providing a steering feel to the steering wheel 12 by use of a steering feel assisting apparatus of the SBW system of the present invention with reference to FIG. 7, first, in a state in which the vehicle starts off and the powers of the motor and the actuator are switched off, as in FIG. 5, both the first brake arm 30a and the second brake arm 30b friction-contact with the disk 10 and bidirectional rotation of the disk 10 is restricted (S100).

However, in a state in which the power of the vehicle is switched on and the powers of the steering feel motor 14 and the actuator 21 are switched on, it is determined whether a soft lock operation of the steering angle is required by use of the steering angle θ and the torque value of the steering motor 16 (S10).

That is, the controller 50 is configured to restrict rotation of the steering shaft 11 by generating a maximum repulsive force (soft lock) in the steering feel motor 14 when it is determined that an absolute value of a target torque $T_{target}$ of the steering motor 16 is an absolute value of a threshold torque $T_{threshold}$ or more and a differential value of an absolute value of the target torque $T_{target}$ is more than 0 or an absolute value of the steering angle θ is an absolute value of a restraint angle $θ_{limit}$ or more (S20).

Meanwhile, when the condition is not satisfied in the determination result of step S10, a steering feel is generated with a torque which is lower than the maximum repulsive force of the steering feel motor 14 and is provided to the steering shaft 11 (S90). Of course, accordingly, the rotation of the disk 10 is controlled not to be restricted by spacing both the first brake arm 30a and the second brake arm 30b apart from the disk 10.

Meanwhile, after step S30, it is determined whether an additional steering feel operation of the steering wheel is required by use of the steering angle θ and the torque value of the steering motor 16 (S30).

That is, it is determined that the absolute value of the target torque $T_{target}$ of the steering motor 16 is less than the absolute value of the threshold torque $T_{threshold}$ and the absolute value of the steering angle θ is less than the restraint angle ° limit.

Accordingly, in the determination result of step S30, when it is determined whether an additional steering feel operation is required as the above condition is not satisfied, the rotation direction that requires the steering feel operation is determined by determining whether the differential value of the absolute value of the steering angle is more than 0 and the differential value of the steering angle is more than 0 (S40).

In the determination result of step S40, when it is required to limit rotation of the disk 10 in the counterclockwise direction thereof, as in FIG. 3, the cam 20 is eccentrically rotated in the second eccentric direction such that the first brake arm 30*a* friction-contacts with the external peripheral surface of the disk 10 to provide an additional steering feel for counterclockwise rotation thereof, and accordingly, the counterclockwise rotation of the steering wheel 12 is restricted (S50).

Meanwhile, in the determination result of step S40, when it is required to limit rotation of the disk 10 in the clockwise direction thereof, as in FIG. 4, the cam 20 is eccentrically rotated in the third eccentric direction such that the second brake arm 30*b* friction-contacts with the external peripheral surface of the disk 10 to provide an additional steering feel for clockwise rotation thereof, and accordingly, the clockwise rotation of the steering wheel 12 is restricted (S60).

Because the steering feel motor 14 is maintained at a maximum torque in a process of restricting rotation of the disk 10 in step S50 and step S60, the driver recognizes that the steering angle cannot be rotated in the corresponding rotation direction more certainly (S70).

Subsequently, it is determined whether the absolute value of the target torque $T_{target}$ of the steering motor 16 is less than the absolute value of the threshold torque $T_{threshold}$ and the absolute value of the steering angle θ is less than the restraint angle $θ_{limit}$ (S80).

In the determination result of step S80, when the above condition is satisfied, as in FIG. 2, the bidirectional rotation of the steering wheel is allowed by eccentrically rotating the cam 20 in the first eccentric direction such that both the first brake arm 30*a* and the second brake arm 30*b* are released from the friction-contact with the external peripheral surface of the disk 10 (S90).

Meanwhile, if a failure of the steering feel motor 14 or the actuator 21 is detected during a start-on of the vehicle (S110), the powers thereof are interrupted at the same time, and the brake arm 30 returns to the location (initial location) in a start-off state to provide a frictional force of a predetermined level (e.g., 5 Nm) to the driver (S120).

Accordingly, because a frictional force is provided even though a steering feel function is lost due to a failure of the steering feel motor 14, the steering sensitivity is lowered and safe driving is possible.

For reference, a function of recognizing the steering angle and transmitting a rack target position which is an essential function that requires a fail operation may be made dual (a full redundant angle sensor/a secondary controller 52) on the controller 50 (ECU).

Furthermore, a main function of the steering feel apparatus, such as control of the steering feel motor and the actuator may be performed by a primary controller 51 in the controller 50.

As described above, because selective friction-contact with the disk 10 constrained by the steering shaft 11 is made of according to a change of the rotational angle of the cam 20 by control of the actuator 21, an additional steering feel is provided only in a rotation direction which is to be restricted.

Accordingly, a torque which is lack in a steering feel motor may be additionally provided when the driver desires to feel a high load (e.g., an end portion feeling of the steering angle), and the steering wheel 12 may be rotated when the driver performs a reverse operation of the steering wheel 12 in a state in which the one-directional rotation of the disk 10 is restricted, and thus a reverse locking phenomenon of the steering wheel 12 is removed.

Moreover, when the steering feel motor fails while driving of the vehicle, the steering sensitivity is lowered by immediately providing a frictional force to the driver and preventing abrupt steering, and thus the manipulation and the driving safety may be provided to the driver.

Furthermore, in a start-off state, a function of preventing excessive bidirectional rotation of the steering wheel may be realized without any additional configuration or application of an electric voltage.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A steering feel assisting apparatus of a steer-by-wire (SBW) system, the steering feel assisting apparatus comprising:
   a disk connected to a steering shaft and configured to rotate with the steering shaft;
   a cam engaged to an actuator and configured to receive a rotational force of the actuator to be eccentrically rotated;
   a brake arm including a first end portion and a second end portion and configured to selectively friction-contact with an external peripheral surface of the disk to provide a predetermined frictional force in a forward rotation direction of the disk as the brake arm rotates in conjunction with a rotation of the cam;
   a steering feel motor configured to provide a steering feel to the steering shaft;
   a steering motor coupled to a rack bar and configured to provide a steering force to the rack bar; and
   a controller electrically connected to a steering angle sensor, the steering feel motor, the steering motor and the actuator and configured to selectively provide the steering feel in a forward rotation direction of the steering shaft by controlling an operation of the steering feel motor or the actuator according to a steering angle and a torque value of the steering motor,
   wherein the brake arm includes a first brake arm and a second brake arm provided on a first side and a second side of the cam, respectively,
   wherein one or both of the second end portions of the first and second brake arms friction-contacts with a point of a rotation radius of the cam, which contacts with the external peripheral surface of the disk while drawing a tangential line, and
   wherein the controller is configured to restrict a rotation of the steering shaft by generating a maximum repulsive force in the steering feel motor when an absolute value of a target torque of the steering motor is equal to or greater than an absolute value of a threshold torque and a differential value of the absolute value of the target torque is more than 0.

2. The steering feel assisting apparatus of claim 1, wherein a rotation shaft is provided at the first end portion of the brake arm and the cam contacts with a middle portion of the brake arm whereby the second end portion of the brake arm rotates about the rotation shaft in a direction in which the second end portion of the brake arm becomes closer to or far away from the disk as the cam eccentrically rotates and selectively friction-contacts with the external peripheral surface of the disk.

3. The steering feel assisting apparatus of claim 2, further including:
   a press spring mounted on a housing and configured to provide an elastic force to the brake arm in a rotation direction in which the second end portion of the brake arm faces the disk.

4. The steering feel assisting apparatus of claim 2, wherein a first rotation shaft formed on the first end portion of the first brake arm and a second rotation shaft formed on a first end portion of the second brake arm are located in directions that are opposite to the disk with respect to the cam, and
   wherein the second end portion of the first brake arm and the second end portion of the second brake arm are located on the first side of the disk and the second side of the disk, respectively.

5. The steering feel assisting apparatus of claim 4, wherein the disk is shaft-coupled to the steering shaft, wherein the cam is mounted on a side of the disk, and wherein an axial direction of rotation axes of the disk, the cam, and the first and second brake arms are in a same direction to be parallel to each other.

6. The steering feel assisting apparatus of claim 4, wherein the first and second brake arms selectively friction-contact with the disk for eccentric directions of the cam;
   wherein the second end portion of the first brake arm and the second end portion of the second brake arm are released from the friction-contact with the disk in a first eccentric direction in which the cam is eccentric toward the first and second rotation shafts in an entire rotation section of the cam;
   wherein the second end portion of the first brake arm friction-contacts with the disk in a second eccentric direction in which the cam is eccentric toward the second brake arm;
   wherein the second end portion of the second brake arm friction-contacts with the disk in a third eccentric direction in which the cam is eccentric toward the first brake arm; and
   wherein the second end portion of the first brake arm and the second end portion of the second brake arm friction-contact with the disk in a fourth eccentric direction in which the cam is eccentric toward the disk.

7. The steering feel assisting apparatus of claim 2, further including:
   a return spring mounted on a housing, engaged to the cam, and configured to provide an elastic force to the cam in a direction in which the cam is eccentric toward the disk.

8. The steering feel assisting apparatus of claim 2, wherein a friction brush is separately coupled to the second end portion of the brake arm to friction-contact with the external peripheral surface of the disk, and
   wherein a friction pattern is formed on the external peripheral surface of the disk.

9. The steering feel assisting apparatus of claim 2, further including:
   the steering angle sensor configured to detect a steering angle of the steering shaft.

10. The steering feel assisting apparatus of claim 9, wherein the controller:
    after a maximum torque is generated by the steering feel motor, maintains the absolute value of the target torque at the absolute value of the threshold torque or more, and when the absolute value of the steering angle is maintained at a restraint angle or more, determines a rotation direction of the disk, in which the predetermined frictional force is to be provided; and
    provides a frictional force to a forward or reverse rotation of the disk through the brake arm by controlling a rotation of the cam by the actuator.

11. The steering feel assisting apparatus of claim 10, wherein when a target frictional direction of the disk is a reverse direction, the first brake arm friction-contacts with the disk by controlling a rotation of the cam, and the second brake arm is released from friction-contact with the disk to friction-contact with the disk for the reverse rotation of the disk, and wherein when a target constraint direction of the disk is a forward direction, the second brake arm is brought into friction-contact with the disk by controlling a rotation of the cam, and the first brake arm is released from the friction-contact with the disk to friction-contact with the disk for the forward rotation of the disk.

12. The steering feel assisting apparatus of claim 10, wherein the controller is configured to perform a control to maintain a maximum repulsive force of the steering feel motor in a process of providing a frictional force to the disk by the brake arm.

13. The steering feel assisting apparatus of claim 9, wherein the controller is configured to control the first brake arm and the second brake arm to be released from the friction-contact with the disk when the absolute value of the target torque is less than the absolute value of the threshold torque and the absolute value of the steering angle is less than a restraint angle after the maximum repulsive force is generated by the steering feel motor.

14. The steering feel assisting apparatus of claim 12, wherein the controller is configured to control the first brake arm and the second brake arm to be released from the friction-contact with the disk when the absolute value of the target torque is less than the absolute value of the threshold torque and the absolute value of the steering angle is less than the restraint angle after the maximum repulsive force is generated by the steering feel motor.

15. The steering feel assisting apparatus of claim 9, wherein the controller is configured to perform a control to provide a frictional force in forward and reverse rotation directions of the disk by bringing the first brake arm and the second brake arm into friction-contact with the disk by controlling a rotation of the cam during a start-off of a vehicle.

16. A method of controlling a steering feel assisting apparatus including a disk connected to a steering shaft and configured to rotate with the steering shaft; a cam engaged to an actuator and configured to receive a rotational force of the actuator to be eccentrically rotated; a brake arm including first and second brake arms provided on a first side and a second side of the cam, respectively and including a first end portion and a second end portion, and configured to selectively friction-contact with an external peripheral surface of the disk to provide a predetermined frictional force in a forward rotation direction of the disk as the first and second brake arms rotate in conjunction with a rotation of the cam; a steering feel motor configured to provide a steering feel to the steering shaft; and a steering motor coupled to a rack bar and configured to provide a steering force to the rack bar, the method comprising:

selectively, by a controller electrically connected to a steering angle sensor, the steering feel motor, the actuator and the steering motor, providing the steering feel in a forward rotation direction of the steering shaft by controlling an operation of the steering feel motor or the actuator according to a steering angle and a torque value of the steering motor, restricting, by the controller, a rotation of the steering shaft by generating a maximum repulsive force in the steering feel motor when an absolute value of a target torque of the steering motor is equal to or greater than an absolute value of a threshold torque and a differential value of the absolute value of the target torque is more than 0, and controlling, by the controller, the first brake arm and the second brake arm to be released from friction-contact with the disk when the absolute value of the target torque is less than the absolute value of the threshold torque and the absolute value of the steering angle is less than a restraint angle after the maximum repulsive force is generated by the steering feel motor, wherein one or both of the second end portions of the first and second brake arms friction-contacts with a point of a rotation radius of the cam, which contacts with the external peripheral surface of the disk while drawing a tangential line.

17. The method of claim 16, after a maximum torque is generated by the steering feel motor, maintaining, by the controller, the absolute value of the target torque at the absolute value of the threshold torque or more, and when the absolute value of the steering angle is maintained at the restraint angle or more, determining a rotation direction of the disk, in which the predetermined frictional force is to be provided; and providing, by the controller, a frictional force to a forward or reverse rotation of the disk through the first and second brake arms in controlling a rotation of the cam by control of the actuator.

18. The method of claim 17, wherein when a target frictional direction of the disk is a reverse direction, the first brake arm friction-contacts with the disk by the controller controlling a rotation of the cam, and the second brake arm is released from the friction-contact with the disk to friction-contact with the disk for the reverse rotation of the disk by the controller controlling the rotation of the cam, and wherein when a target constraint direction of the disk is a forward direction, the second brake arm is brought into friction-contact with the disk by the controller controlling a rotation of the cam, and the first brake arm is released from the friction-contact with the disk to friction-contact with the disk for the forward rotation of the disk by the controller controlling the rotation of the cam.

* * * * *